T. O. MARTIN.
LATHE TURNING TOOL.
APPLICATION FILED JUNE 5, 1920.

1,414,520.

Patented May 2, 1922.

T. O. Martin, Inventor

By Larry T. Lacy, Attorneys

UNITED STATES PATENT OFFICE.

TREVILLIE OWEN MARTIN, OF JACKSON, TENNESSEE.

LATHE TURNING TOOL.

1,414,520.  Specification of Letters Patent.  Patented May 2, 1922.

Application filed June 5, 1920. Serial No. 386,856.

*To all whom it may concern:*

Be it known that I, TREVILLIE O. MARTIN, a citizen of the United States, residing at Jackson, in the county of Madison and State of Tennessee, have invented certain new and useful Improvements in Lathe Turning Tools, of which the following is a specification.

This invention relates to tools of that type adapted for turning metal stock in lathes.

The invention has, as one of its features, the conservation of expensive high speed tool steels such as are used in making turning tools, twist drills and the like, by converting discarded twist drills into lathe tools.

Aside from the conservation of material, the invention has as another of its features the provision of a tool of this character formed with a spirally twisted shank, thus providing a maximum diameter with a minimum of metal and having a cutting end shaped for use as a turning tool. This construction permits of the tool being ground repeatedly and always presenting the same cross section for grinding.

A further feature of the invention resulting from forming the tool with a spiral body is that cooling fins are provided which dissipate the heat, this dissipation of the heat being augmented by the fact that the peculiar spiral configuration of the tool body permits of a maximum diameter with a minimum mass of metal.

Figure 1:
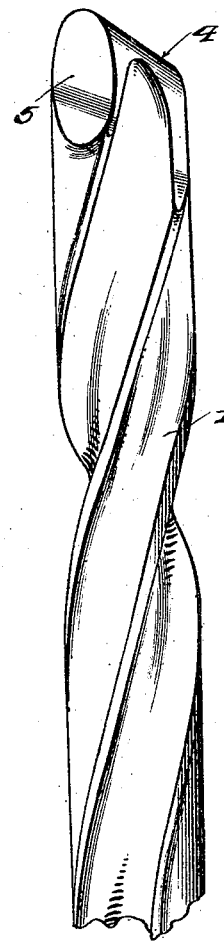
Figures 1, 2 and 3 are side elevations of the tool in different rotated positions.
Figure 2:
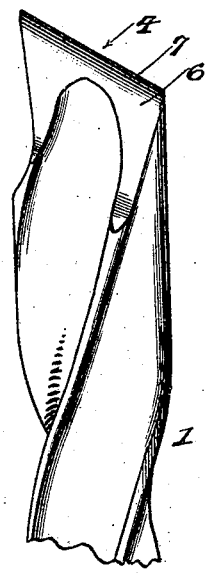
Figure 3:
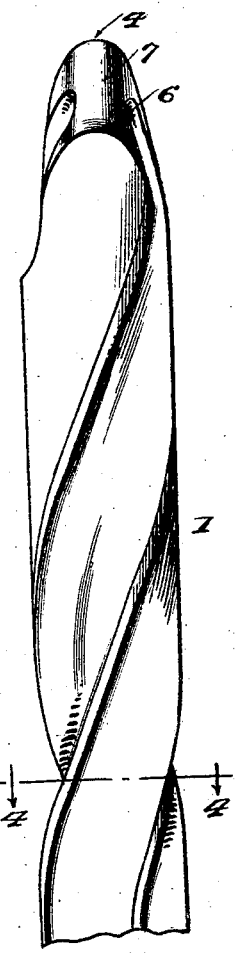
Figure 4:
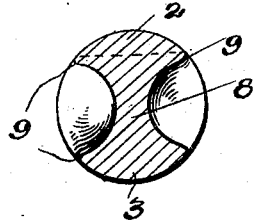
Fig. 4 is a section on the line 4—4 of Fig. 3.

In detail:

The invention, as herein shown, is formed of a twist drill shank 1 which, in cross section, is approximately of the shape shown in Fig. 4 and wherein the lands 2 and 3 of the drill body are clearly shown. It is, of course, apparent that this same cross section is presented throughout the entire length of the twist drill body and for that reason it is possible to grind off the point of the drill body to the form indicated at 4 in Figs. 1, 2 and 3, one land 2 being ground flat on the top side as indicated at 5 and as clearly shown by the dotted line in Fig. 4 and the point then being rounded on both sides and the front as indicated at 6 and beveled as indicated at 7, thus providing a turning tool having the proper clearance for use in turning metals.

It will be seen that in using a spirally twisted body for the purpose of forming the turning tool, I am able to provide a maximum diameter with a minimum mass of metal, the cross sectional area, for instance at 8, being very small and thus permitting rapid dissipation of heat without sacrificing strength of the tool as a whole; and also, by reason of the fact that the edges of the lands are exceedingly thin as indicated at 9 a further cooling effect is obtained.

Figure 5:
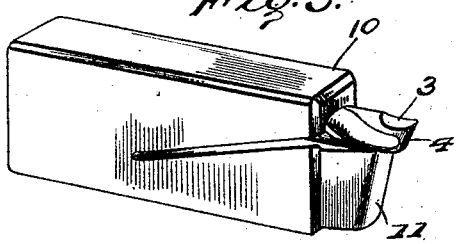
Fig. 5 is a perspective view of the tool in the holder.

Now, with reference to Fig. 5 it will be apparent that the tool presents a substantially cylindrical surface for clamping in a tool holder such as is claimed in Patent No. 1,304,898, issued to me May 27, 1919, which may be used with particularly effective results.

In grinding the twist drill to form a turning tool the lips of the drill are ground so that when the tool is mounted in the holder it may be positioned with the greatest thickness of metal on a perpendicular plane, with the result that the tool presents substantially the same strength as would a full cylindrical tool body.

The holder 10 is especially well adapted for this tool inasmuch as it is supported on the projection 11 whereby chattering of the tool is eliminated.

It is to be noted that in regrinding the tool it is only necessary to rotate it slightly in order to present an identical cross section upon each regrinding of the tool.

I claim:

A turning tool comprising a shank having two diametrically opposite grooves formed spirally therein and providing intervening lands, one of the lands at one end of the shank being formed with a flat face inclined downwardly from the extremity of the shank toward the axis thereof, the shank at its said end being rounded transversely at the opposite sides and front of the flattened surface, and the ends of the grooves extending into the rounded sides and terminating short of the rounded front.

In testimony whereof I affix my signature.

TREVILLIE OWEN MARTIN. [L. S.]